(12) United States Patent
Hellier et al.

(10) Patent No.: US 6,370,788 B1
(45) Date of Patent: Apr. 16, 2002

(54) PROBE WITH VIBRATION DAMPED STYLUS

(75) Inventors: Peter K. Hellier, North Nibley; Graham R. Ferguson, Rodborough, both of (GB)

(73) Assignee: Renishaw PLC, Wotton-under-Edge (GB)

( * ) Notice: Subject to any disclaimer, the term of this patent is extended or adjusted under 35 U.S.C. 154(b) by 0 days.

(21) Appl. No.: 09/492,291

(22) Filed: Jan. 27, 2000

(30) Foreign Application Priority Data

Jan. 29, 1999 (GB) ............................................. 9901871
Feb. 25, 1999 (GB) ............................................. 9904244

(51) Int. Cl.$^7$ ................................................ G01B 5/12
(52) U.S. Cl. .......................................... 33/559; 33/556
(58) Field of Search ......................... 33/556, 558, 559, 33/561, 503

(56) References Cited

U.S. PATENT DOCUMENTS 5,042,162 A * 8/1991 Helms .......................... 33/503
5,511,777 A * 4/1996 McNeely ................... 273/72 A
5,517,124 A * 5/1996 Rhoades et al. ............... 33/559

FOREIGN PATENT DOCUMENTS

| DE | 35 22 061 A1 | 1/1986 |
| DE | 40 01 981 A1 | 7/1990 |
| EP | 0 361 164 A1 | 4/1990 |
| GB | 2 161 934 A | 1/1986 |
| JP | A-61-66913 | 4/1986 |
| JP | A-9-96518 | 4/1997 |
| WO | WO 91/03707 | 3/1991 |

* cited by examiner

Primary Examiner—Diego Gutierrez
Assistant Examiner—Lydia M De Jesús
(74) Attorney, Agent, or Firm—Oliff & Berridge, PLC

(57) ABSTRACT

Vibrations of the stylus (4) of a measuring probe (1) mounted on a machine, and which are transmitted to the probe stylus via the machine quill and probe body, are reduced or eliminated by a vibration damping means positioned within a cavity of the stylus. FIG. 2 illustrates a first embodiment in which the vibration damping means is a unconstrained rubber cylinder (16), in a hollow cartridge (12) connected to the stylus at its tip. Alternatively a dynamic vibration absorber can be used.

6 Claims, 10 Drawing Sheets

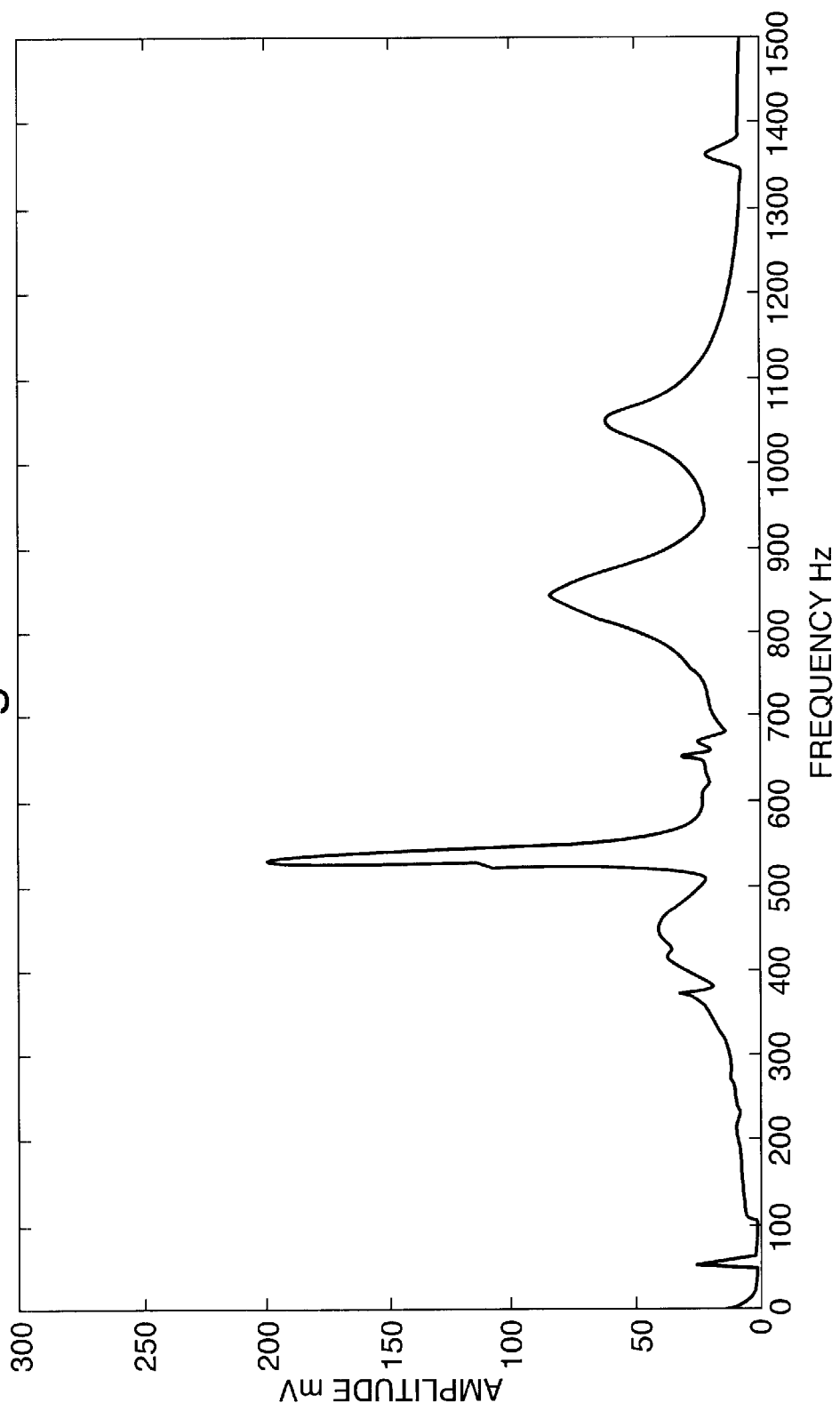

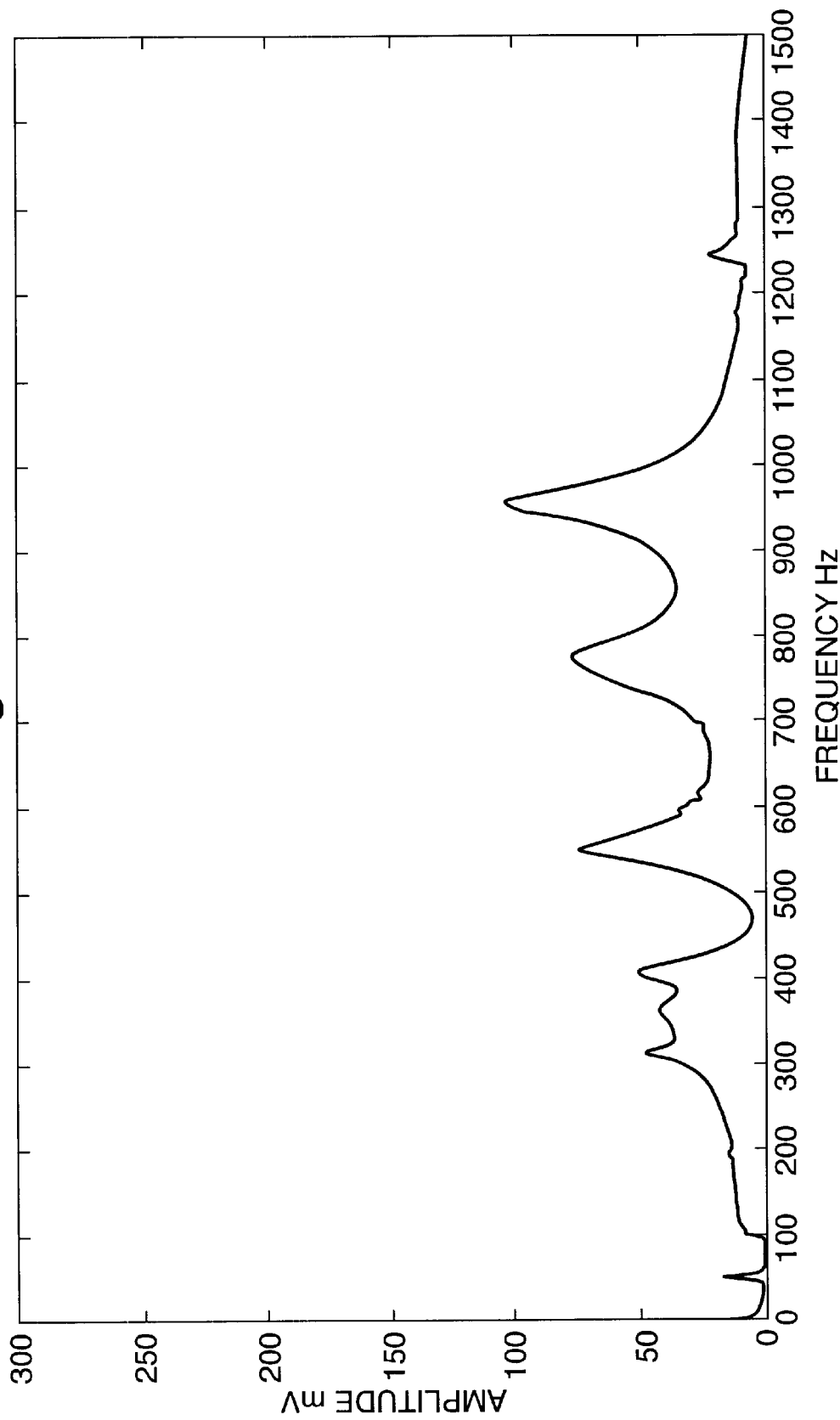

PROBE WITH VIBRATION DAMPED STYLUS

The present invention relates to probes for use in coordinate measuring machines (CMMs) or machine tools, and has particular reference to a probe with a stylus for contacting the surface of a workpiece.

Probes for use in machine tools and coordinate measuring machines, are mounted on the end of a spindle of a machine tool, or a quill of a CMM, and are moved towards a workpiece to bring a stylus, which projects from the base of the probe, into contact with a surface of a workpiece. Contact between the stylus and the surface of the workpiece is indicated by a signal from the signalling mechanism within the probe, which causes the machine to stop and the machine scale readings to be latched. By contacting a number of points on the surface of a workpiece, the shape and/or dimensions of the workpiece or a feature on the workpiece can be determined.

The accuracy of the measuring process is dependent upon the probe repeatably generating a signal each time the stylus tip is at a predetermined position relative to the probe body. However, vibrations of the quill or spindle upon which the probe is mounted, if transmitted to the probe stylus, give rise to an uncertainty in the position of the probe stylus tip and the repeatability of the signalling is degraded. If the vibrations transmitted to the stylus happen to coincide with a natural resonant frequency of the stylus or the combination of the stylus and its mounting, the amplitude of the vibration at the stylus tip can be relatively large and give rise to significant errors in the subsequent measurements on the workpiece.

In the past it has been known to change one or more characteristics of the stylus e.g. its material or diameter, to change its stiffness such that its resonant frequency is moved away from the predominant forcing frequency of the vibration of the machine spindle. This is preferably achieved by increasing the resonant frequency of the stylus beyond the predominant forcing frequency of the machine.

The effects of simply changing the resonant frequency of the stylus are limited in the extent to which they can change the amplitude of the vibration of the stylus at its resonant frequency, or at other frequencies, and do not therefore always provide a satisfactory solution to the problem.

The present invention provides an alternative method of changing the amplitude of the vibration of a stylus at its resonant frequency which is more effective than the above-described previous methods.

In accordance with the present invention, in its broadest application a stylus of a measuring probe has an internal cavity in which is provided vibration damping means.

In a first embodiment of the invention the vibration damping means comprises an unconstrained material mass.

A variety of materials have been tried ranging from rubber sleeves of different diameters, glass dust, and finely chopped wire. Each produced a significant reduction in the maximum amplitude of stylus vibration with varying beneficial effects on other vibration amplitudes.

In a second embodiment of the invention the vibration damping means comprises a dynamic vibration absorber which is tuned to the natural frequency of vibration of the stylus.

In both embodiments the vibration damping means is preferably provided adjacent the tip of the stylus where the amplitude of the vibration is maximum.

Examples of the present invention will now be described in more detail and with reference to the accompanying drawings in which.

Figure 4A:
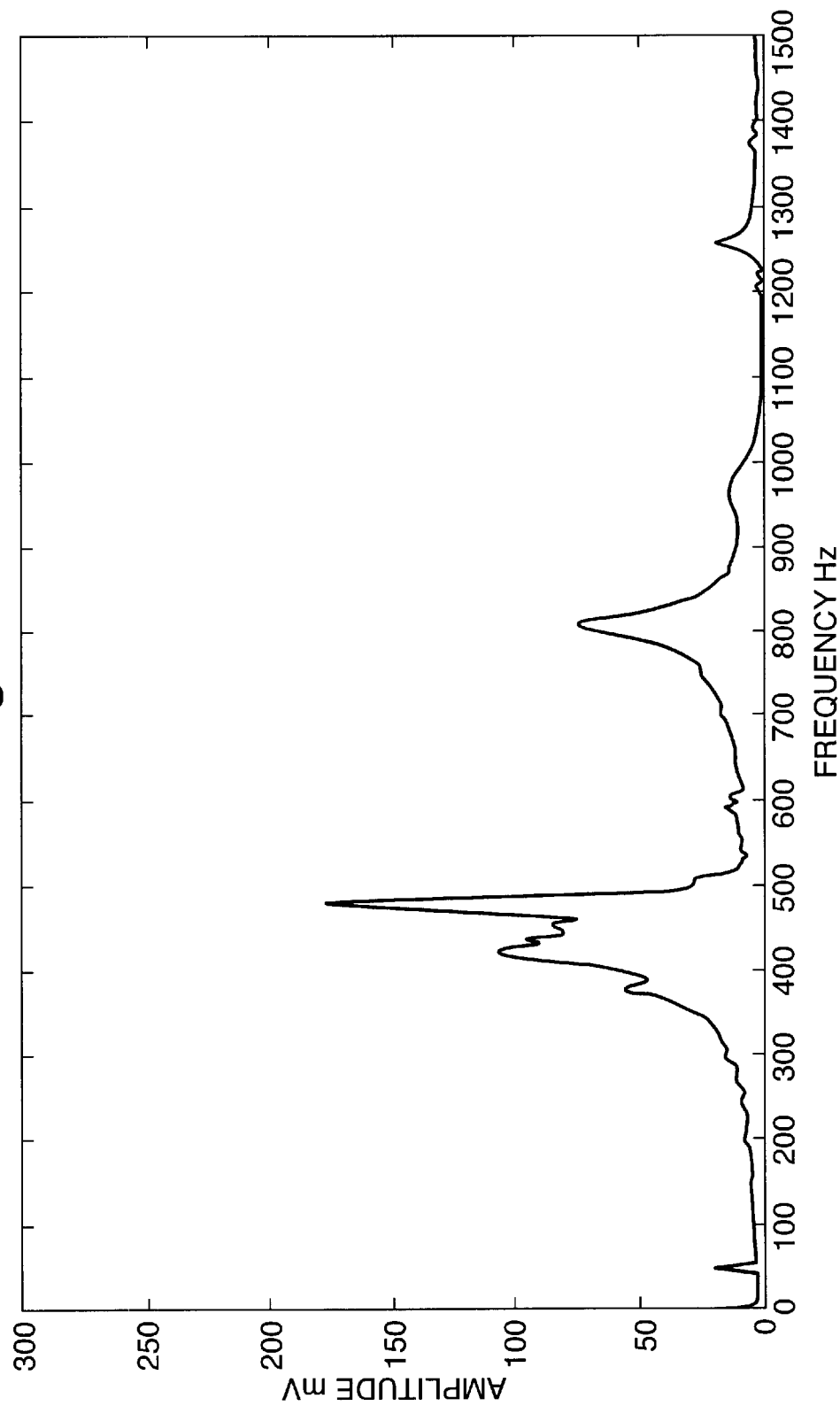
Figure 4B:
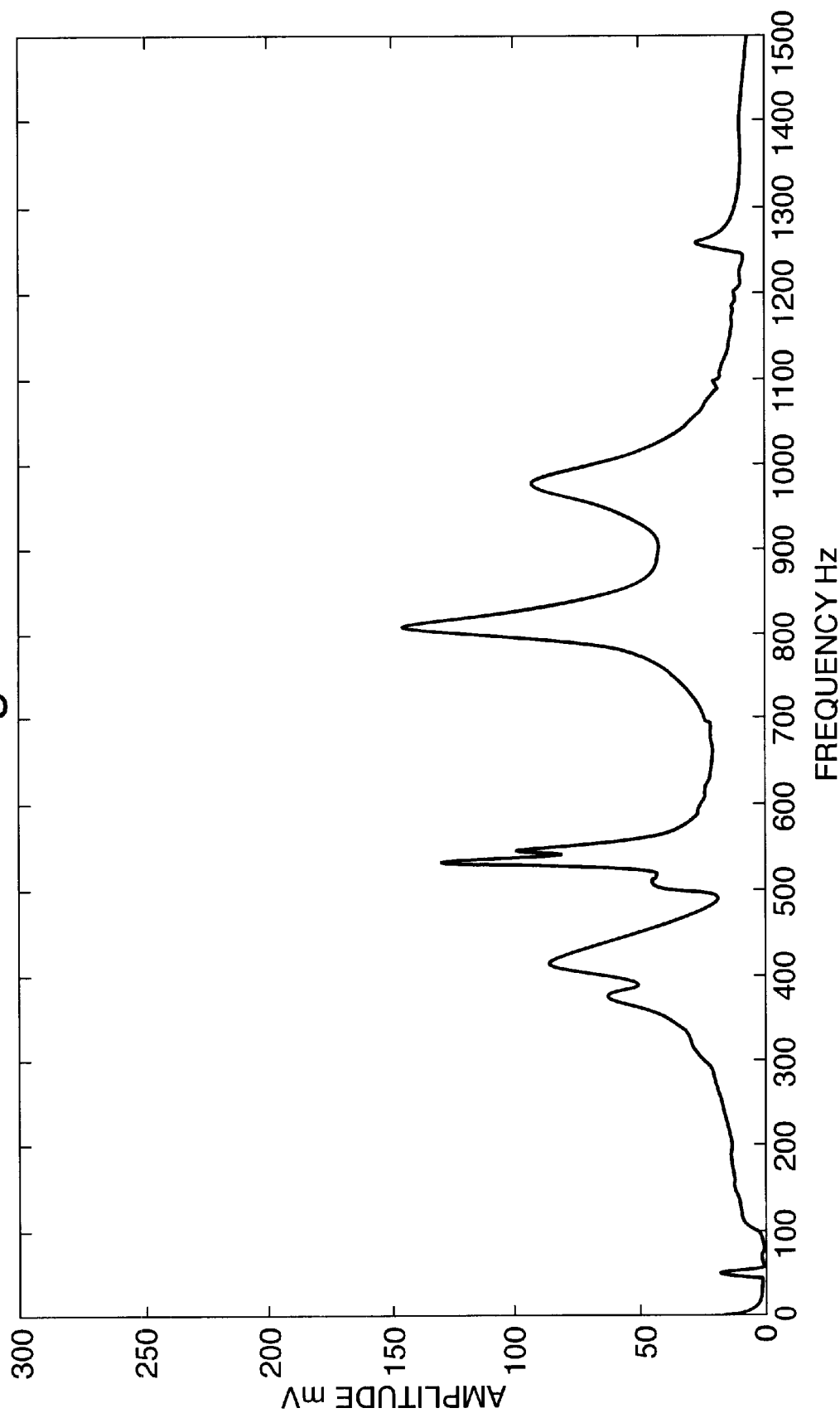
Figure 4C:
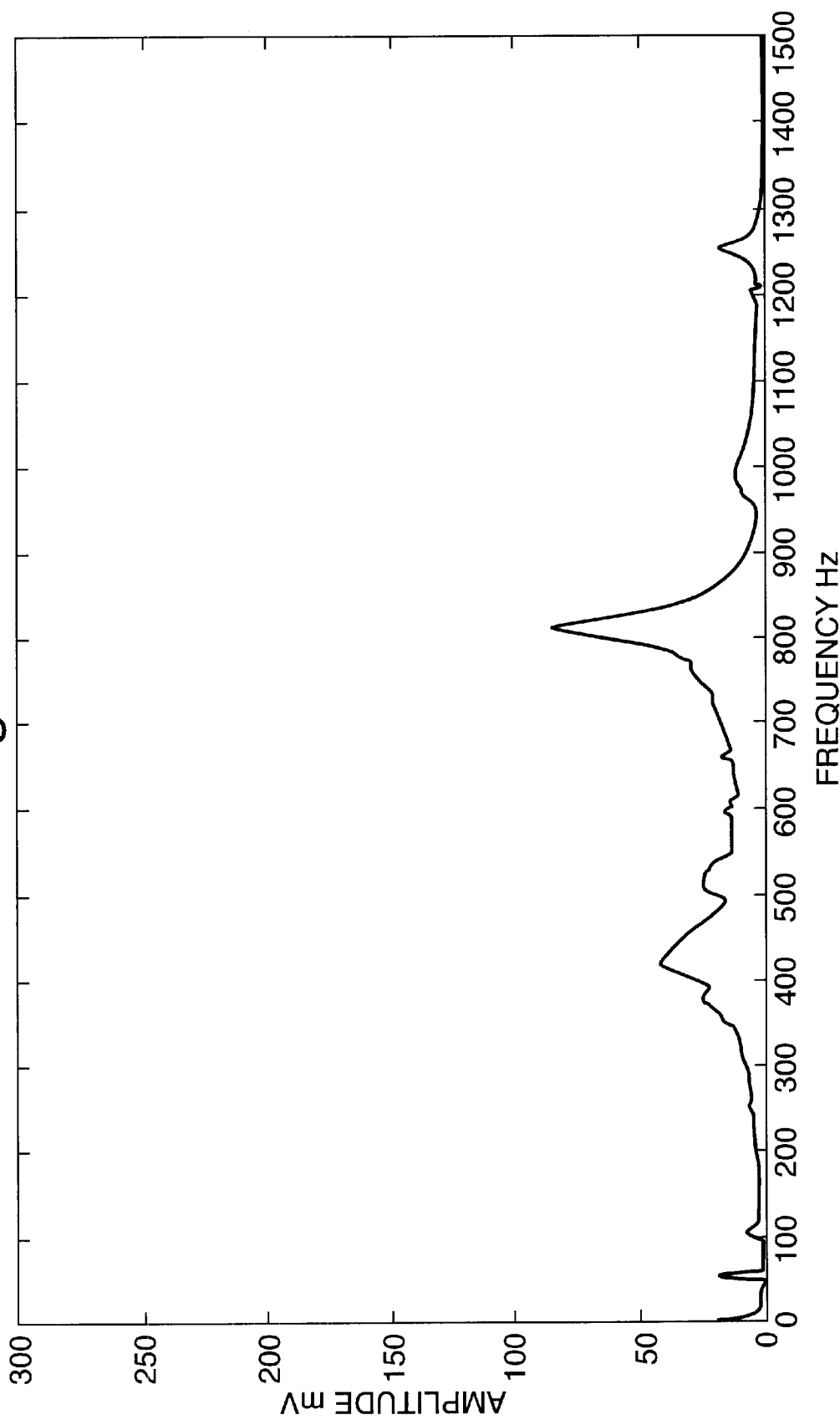
Figure 5A:
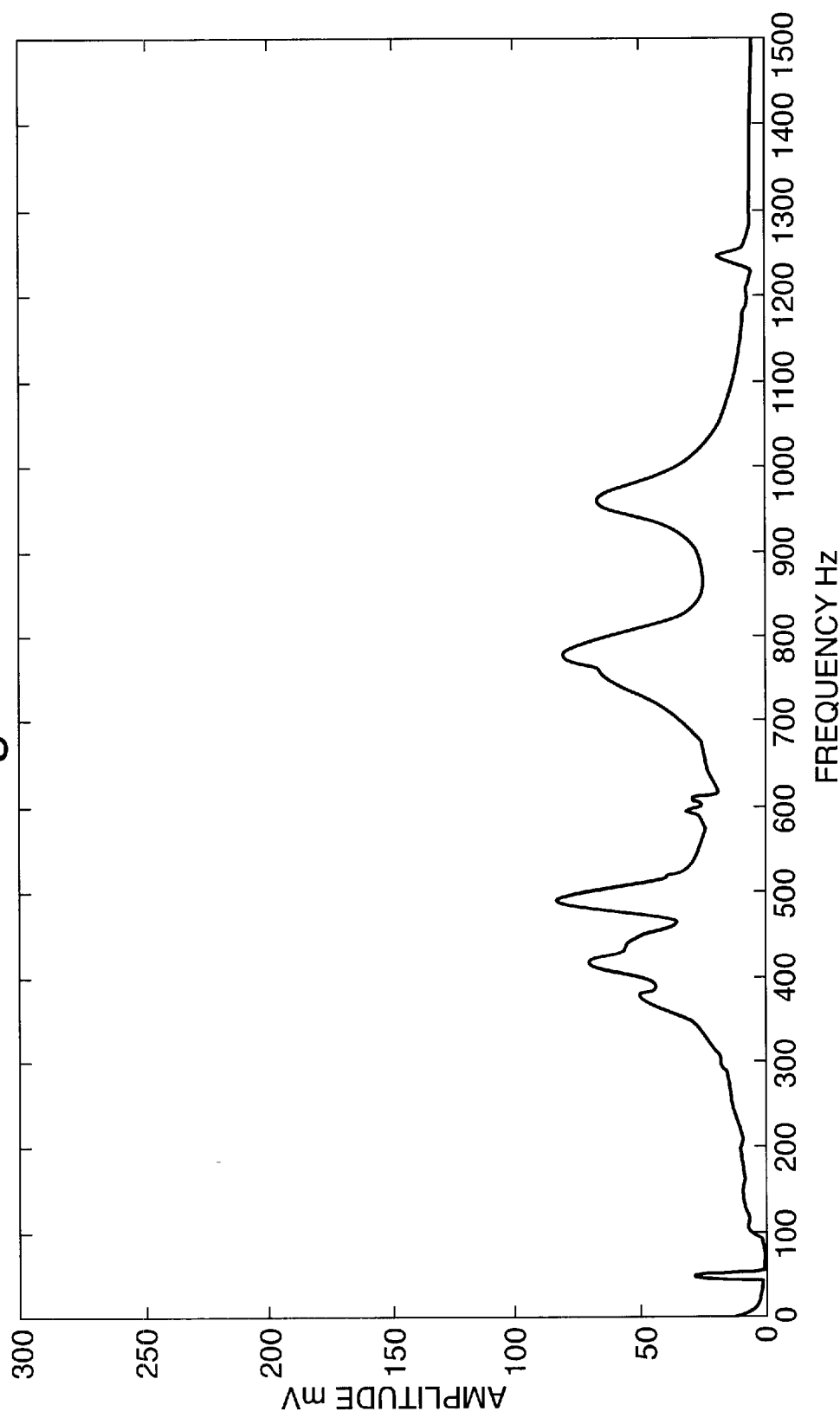
Figure 5B:
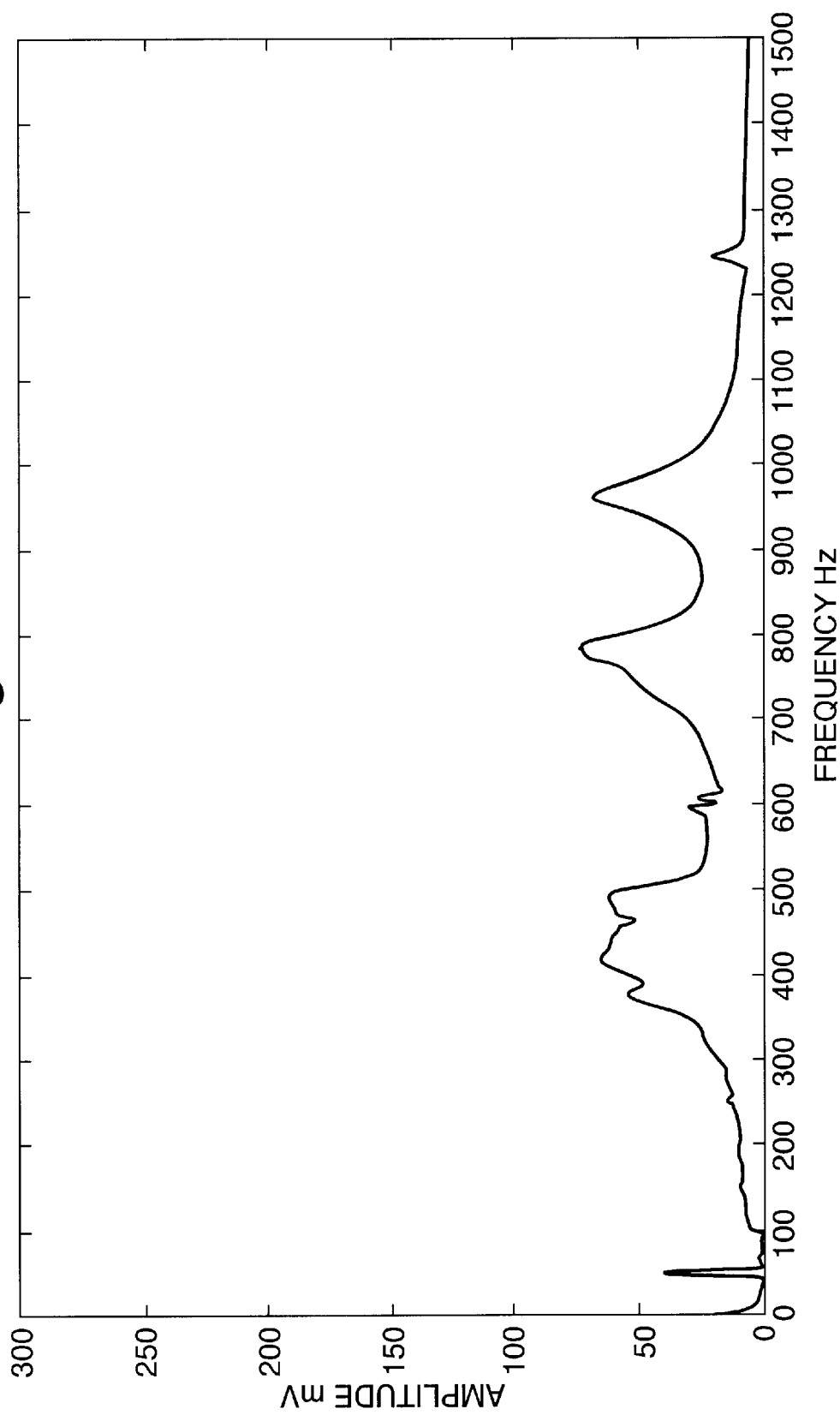
Figure 6:
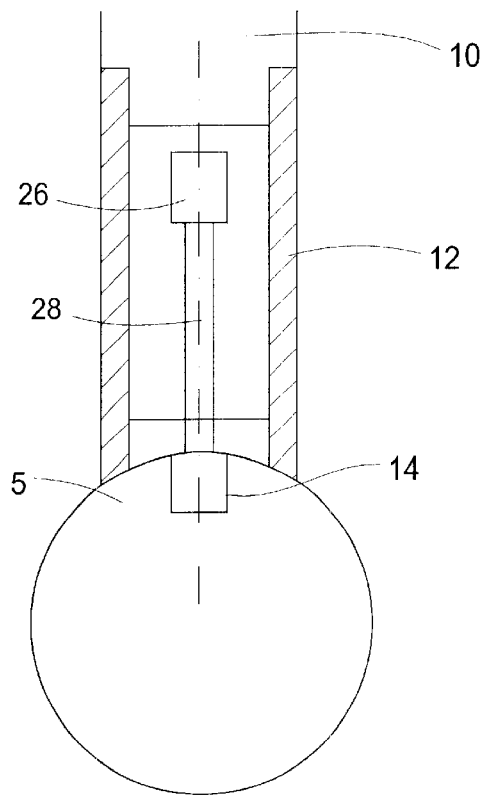
Figure 7:
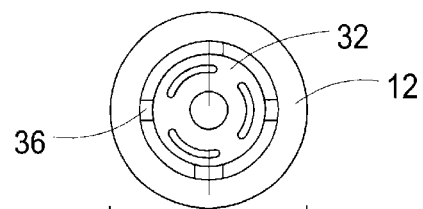
Figure 7:
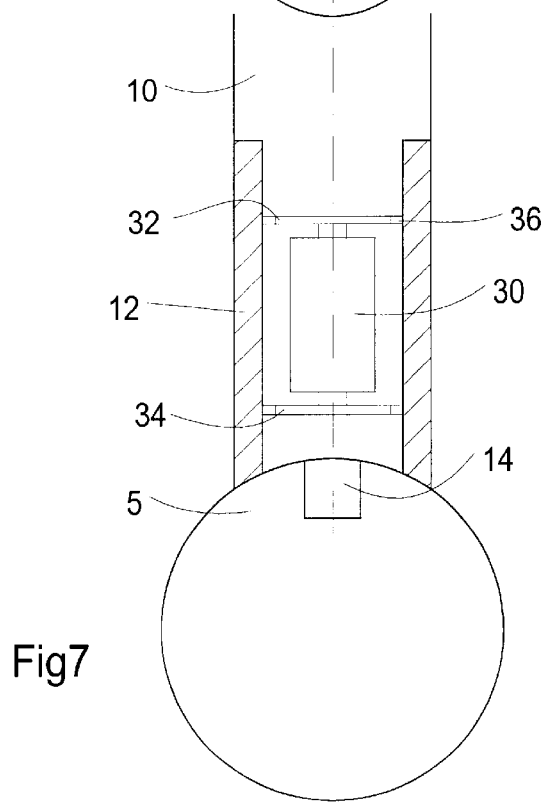
Figure 8:
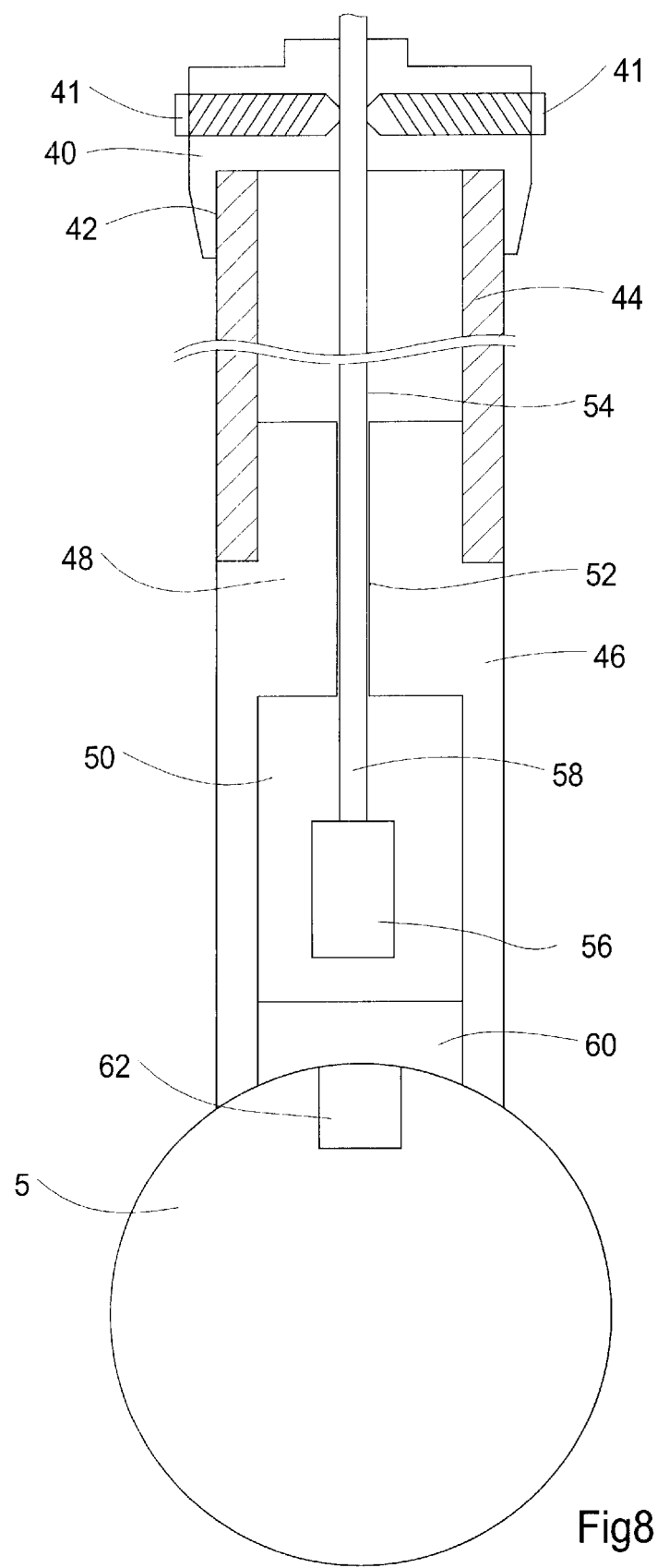

FIGS. 4a–c show the comparison of the vibration characteristics of a standard stylus, and of a modified stylus with and without the unconstrained material mass;

FIGS. 5a and 5b show the effects of alternative unconstrained material masses in the stylus cavity;

FIG. 6 is an enlarged view of a stylus incorporating a dynamic vibration absorber of the present invention in a first configuration;

FIG. 7 shows a second configuration of a dynamic vibration absorber of the present invention within a stylus;

FIG. 8 shows yet another alternative configuration of a dynamic vibration absorber of the present invention within a stylus; and FIGS. 9a and 9b show the effects on the amplitude of the stylus of the inclusion of a dynamic vibration absorber.

Figure 1:
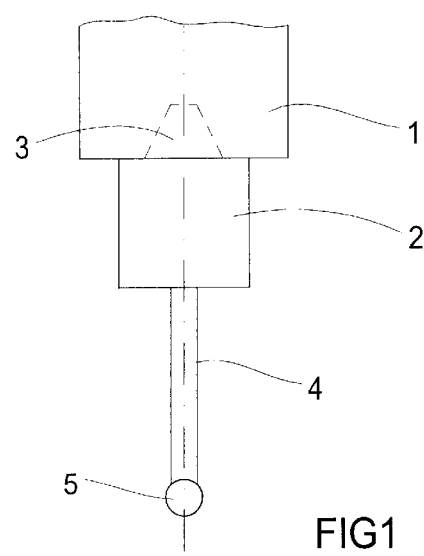
FIG. 1 is a diagrammatic representation of a probe and stylus mounted on the quill of a machine.

Referring now to the drawings, there is shown in FIG. 1 a simplified representation of a machine quill 1 to which a probe 2 is mounted in conventional manner by a tapered shank 3, and illustrates a conventional stylus 4 which extends outwardly from the free end of the probe. The protruding stylus is provided with a spherical tip 5 for contacting a workpiece. The stylus tip need not be spherical, but may be any appropriate shape depending on the type of measurements the probe is to perform. Although the stylus is shown extending vertically from the probe, the invention can be applied to a stylus in any orientation.

Figures 2, 3:
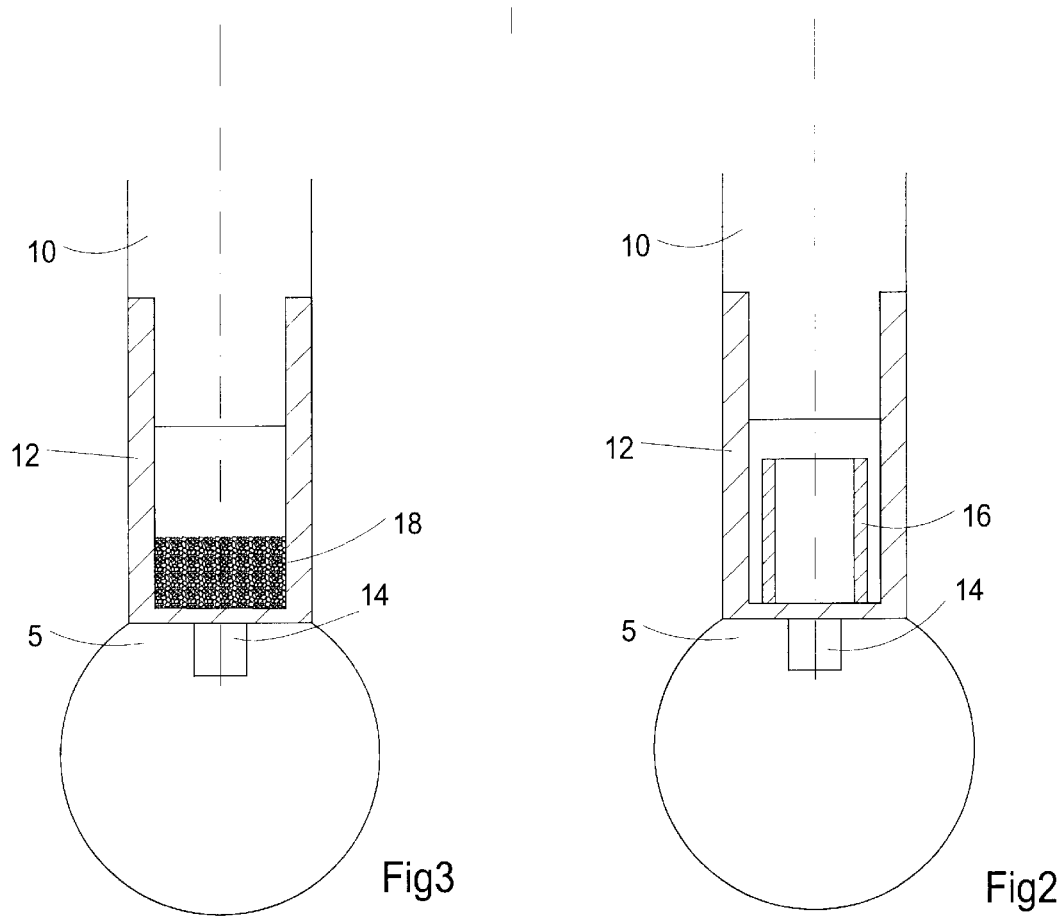
FIG. 2 is an enlarged view of an embodiment of a vibration damped stylus of the present invention which includes a first example of an unconstrained material mass.
FIG. 3 shows an embodiment of a vibration damped stylus according to the present invention which includes a second example of an unconstrained material mass.

FIG. 2 shows an enlarged view of the stylus 4 of FIG. 1. The stylus consists of a stem 10 made from any of the conventional stylus materials such as for example steel, ceramic, or carbon fibre. The stem may be solid or hollow as required.

Attached to the end of the stem in any convenient manner is a hollow cartridge 12 to the free end of which the stylus ball 5 is attached. The stylus ball is attached to the end of the cartridge in any convenient manner, but in the present example, it is illustrated as being glued onto the end of a spigot 14 projecting from the end of the cartridge. The cartridge may be made from any conventional materials such as steel or aluminium.

The material mass is placed within the hollow cartridge and occupies a volume less than that of the space within the cartridge. In the example show, the material mass is a cylindrical rubber sleeve 16 the outside diameter of which is slightly less than the internal diameter of the cartridge cavity so that the sleeve is free to move within the cartridge when the stylus vibrates.

FIG. 3 illustrates an alternative embodiment of the invention. The same reference numerals are used to indicate the same stylus parts, the modification being that a quantity of glass dust 18 replaces the rubber sleeve of FIG. 2.

FIG. 4a shows the vibration characteristic of an unmodified carbon fibre stylus, which shows a first resonance having two amplitude peaks between 400 Hz and 500 Hz with the maximum amplitude near to 500 Hz, and a second resonance at 800 Hz.

FIG. 4b shows the vibration characteristic of the same stylus when modified to include a hollow aluminium cartridge 12. It can be seen that the addition of the cartridge alone has modified the vibration characteristic by reducing the maximum amplitude of the first resonance and shifting it above 500 Hz while leaving the lower peak at 400 Hz. At the second resonance the maximum amplitude has however, been increased.

FIG. 4c shows the effect of putting the rubber sleeve 16 inside the cartridge. It can be seen that the first resonance has been almost completely eliminated, and the amplitude of the second resonance at 800 HZ has been reduced almost back to the level of the unmodified stylus.

The effects of the other vibrations absorbers tried are illustrated in FIG. 5, and clearly show reductions in the amplitude of vibration of the first resonance in the 400 Hz to 500 Hz frequency band.

FIG. 5a shows the effect of putting a quantity of glass dust in the cartridge, and FIG. 5b shows the effect of chopped wire.

Clearly many other materials could be used in the hollow cartridge, the selection being dependent upon the particular resonance causing the problem and the effect of the material at that frequency.

Although the embodiment described makes use of a hollow cartridge attached to a solid stylus, clearly the stylus itself may be hollow and sealed with an end plug to which the stylus ball is attached.

FIGS. 6 to 9 show an enlarged view of a stylus modified in accordance with a second embodiment of the invention. As in the embodiments shown in FIGS. 1 to 3, the stylus consists of a stem 10 made from any of the conventional stylus materials such as for example steel, ceramic, or carbon fibre. The stem may be solid or hollow as required.

Attached to the end of the stem in any convenient manner is a hollow cartridge 12 to the free end of which the stylus ball 5 is attached. The stylus ball is attached to the end of the cartridge in any convenient manner, but in the present example, it is illustrated as being glued onto the end of a spigot 14 projecting from the end of the cartridge. The cartridge may be made from any conventional materials such as steel or aluminium.

Mounted within the hollow interior of the cartridge is an undamped dynamic vibration absorber. The vibration absorber consists of a mass 26 mounted on the end of a spring 28. Because the vibration which is to be reduced is a lateral vibration of the stylus, the spring is cantilevered from one end and extends longitudinally of the stylus with the mass 26 attached to its free end.

In this example the spring is shown cantilevered from the end adjacent the stylus ball and extends back into the interior of the stylus. Preferably the axis of the spring is coaxial with the longitudinal axis of the stylus.

In order to be effective in minimising the vibration amplitude of the stylus, the mass and spring combination has to be tuned so that its natural frequency of vibration is equal to the natural frequency of vibration of the stylus or the stylus/mounting combination.

When the stylus starts to vibrate laterally, its motion applies an opposite vibration to the mass spring system 26, 28 which is such as to reduce the vibration of the stylus. With correct tuning of the mass spring system 26, 28 the vibration of the stylus can be reduced almost to zero.

Such undamped dynamic vibration absorbers are not new per se, and in fact are described for example in a text book entitled Engineering Dynamics, published by The English University Press Limited, first edition published in 1963, in a chapter on vibrating systems, page 238–241. We have found however, that the unique application of such a mass spring system to the hollow interior of a stylus produced very beneficial effects in minimizing the resonant vibrations of the stylus.

FIG. 7 shows an alternative embodiment of a cartridge for attachment in a similar manner to a stylus stem. In this embodiment, an elongate mass 30 extending along the longitudinal axis of the stylus is attached at its two ends to transversely extending planar springs 32, 34, which have a pattern of cut-outs which enables the mass to vibrate transversely in opposition to the stylus. As shown in the upper view of FIG. 3 each spring has four lugs 36 to enable the springs to be pushed into place with an interference fit.

Undamped dynamic vibration absorbers are generally effective only at the frequency to which they are tuned. In order to get a useful attenuation of the amplitude of vibration across a broader bandwidth of frequencies it is preferable to have some form of damping of the mass spring system of the vibration absorber.

FIG. 8 shows another embodiment which is similar to FIG. 6 except that the dynamic vibration absorber is cantilevered from an end wall of the hollow cartridge and extends into the cartridge towards the stylus ball. This embodiment was devised in order to establish the feasibility of the invention and produced surprising results.

The figure shows a stylus holder 40 having an open recess 42 at one end into which a tubular carbon fibre stylus 44 is fitted and glued.

The cartridge 46 is cylindrical, has a solid portion 48 at one end and a hollow portion 50 at the other. The free end of the solid portion 48 is reduced in diameter so as to be fitted into the open end of the tubular stylus, and has a central hole 52 to receive a wire 54.

One end of the wire 54 passes out of the stylus through a hole in the stylus holder 40, and the other extends through the hole 52 with a clearance and into the hollow portion of the cartridge. The wire is clamped in the stylus holder 40 by grub screws 41.

The vibration absorber is formed by a mass 56 attached to the free end 58 of the wire 54 and is free to vibrate inside the hollow cartridge. A plug 60 closes the cartridge and is formed with a spigot 62 onto which the stylus ball is glued. The vibration damper is finely tuned to vibrate at the correct frequency by unclamping the grub screws 41 and increasing or decreasing the length of the wire in the stylus, and hence the length of the free end 58 of the wire.

After each adjustment the wire is clamped by grub screws 41 and the stylus vibrated through a range of frequencies including the resonant frequencies of the stylus and the stylus/mounting combination while monitoring the amplitude of the resulting vibration. It was found that with this particular arrangement of stylus and vibration absorber, the amplitude of the vibration both at and near the resonant frequency of 500 Hz was significantly reduced.

These results are illustrated in FIGS. 9a and 9b. FIG. 9a shows a high amplitude of vibration of the stylus (between 50 and 200 mv of probe output at 500 Hz), when the mass 56 is pulled back away from the stylus tip until it abuts the top surface of the cavity 50. FIG. 9b shows that the peak amplitude drops to around 70 mv of probe output at 500 Hz when the mass is extended 4 mm into the cavity. The increase in amplitude at about 950 Hz is of little consequence because this frequency is well beyond the main resonant frequency of the probe.

These results appeared to show that the vibration absorber of the FIG. 8 embodiment was no longer acting as a conventional undamped, dynamic vibration absorber at a single frequency, but that its vibration frequency was being damped, or attenuated in some way, by the presence of the hole 52, or the remainder of the length of the wire.

Other forms of damping could be used. For example, the mass could be magnetic so that its movement relative to the metal walls of the cartridge introduce eddy currents in these walls to damp the motion. A similar effect could be achieved if the plug 60 was metallic. Alternatively the hollow cartridge could be filled with oil and sealed.

The vibration absorber has been shown in the form of a mass on the end of a wire, but other forms of spring such as a coil spring appropriately oriented to deal with the vibration may be used.

Although the invention has been described with reference to damping the vibrations of a probe stylus directly by providing vibration damping means within the stylus, it is envisaged that at least a partial damping effect could be achieved by providing vibration damping means in a suitable cavity of one of the other elements of the probe, for example, the stylus holder, or probe body.

What is claimed is:

1. A stylus for use with a measuring probe, comprising:
   a supported end;
   a free end having a work piece-contacting tip;
   an internal cavity adjacent the free end; and
   a vibration damping device disposed in the internal cavity, the vibration damping device including an unconstrained material mass that occupies a volume which is less than the volume of the cavity such that the unconstrained material mass is movable within the cavity.

2. A stylus according to claim 1 and wherein the unconstrained material mass is an elastomeric sleeve.

3. A stylus according to claim 1 and wherein the unconstrained material mass is glass dust.

4. A stylus according to claim 1 and wherein the unconstrained material mass is chopped wire.

5. A stylus for use with a measuring probe, comprising:
   a supported end;
   a free end having a work piece-contacting tip;
   an internal cavity adjacent the free end, the internal cavity defining an interior wall; and
   a vibration damping device disposed in the internal cavity, the vibration damping device including an unconstrained material mass, the unconstrained material mass and the interior wall of the cavity defining a gap therebetween such that the unconstrained material mass is movable within the cavity.

6. A stylus for use with a measuring probe, comprising:
   a supported end;
   a free end having a work piece-contacting tip;
   an internal cavity adjacent the free end; and
   a vibration damping device disposed in the internal cavity, the vibration damping device including an unconstrained material mass, the unconstrained material mass being an elastomeric sleeve defining a diameter that is smaller than the diameter of the internal cavity.

\* \* \* \* \*

UNITED STATES PATENT AND TRADEMARK OFFICE
CERTIFICATE OF CORRECTION

PATENT NO.    : 6,370,788 B1
DATED         : April 16, 2002
INVENTOR(S)   : Peter K. Hellier et al.

It is certified that error appears in the above-identified patent and that said Letters Patent is hereby corrected as shown below:

<u>Title page,</u>
Item [30], should read:
  -- Foreign Application Priority Data

Jan. 29, 1999   (GB) ........................9901871.5
Feb. 25, 1999   (GB) .......................9904244.2 --

Signed and Sealed this

Tenth Day of September, 2002

*Attest:*

*Attesting Officer*

JAMES E. ROGAN
*Director of the United States Patent and Trademark Office*